United States Patent Office 3,512,714
Patented May 19, 1970

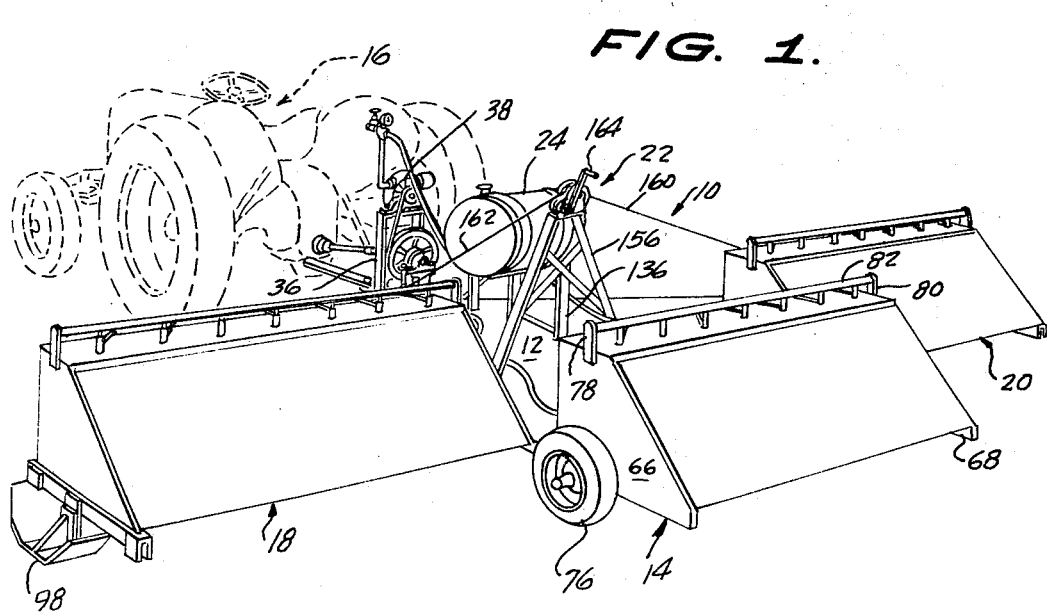
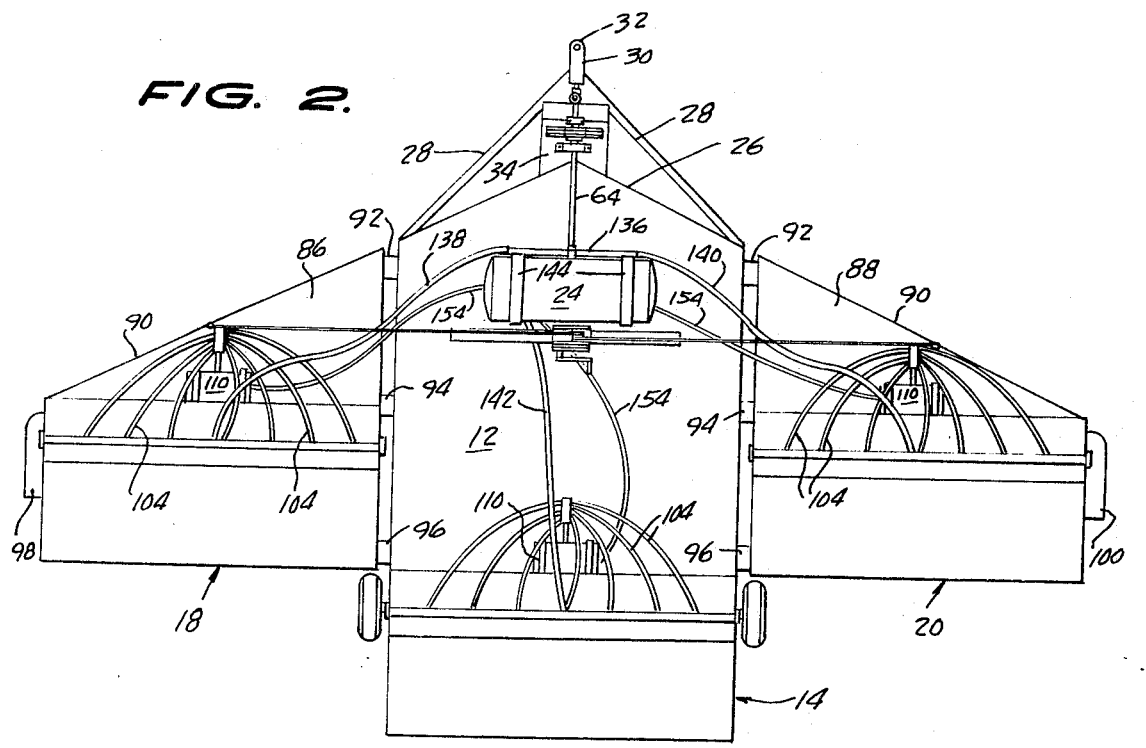

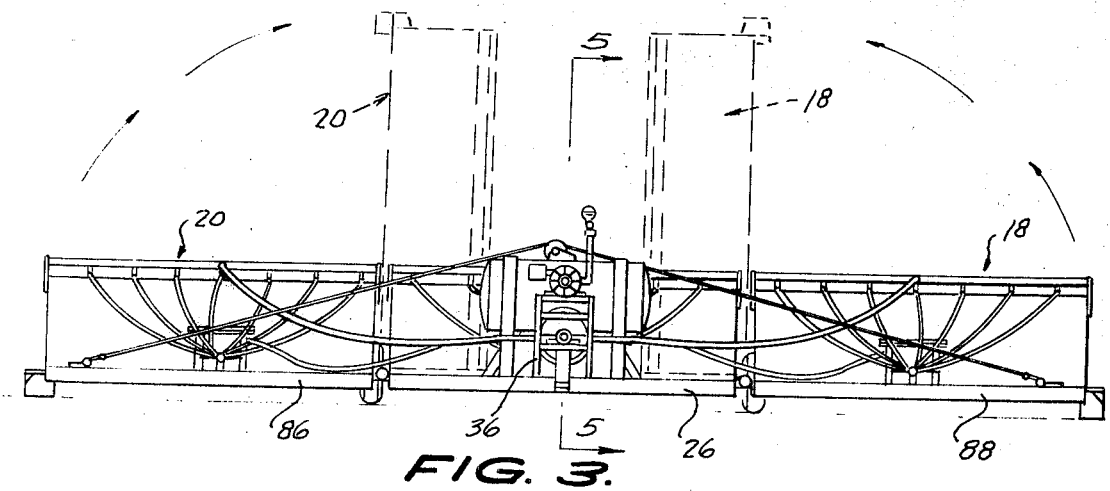
FIG. 3.
FIG. 4.
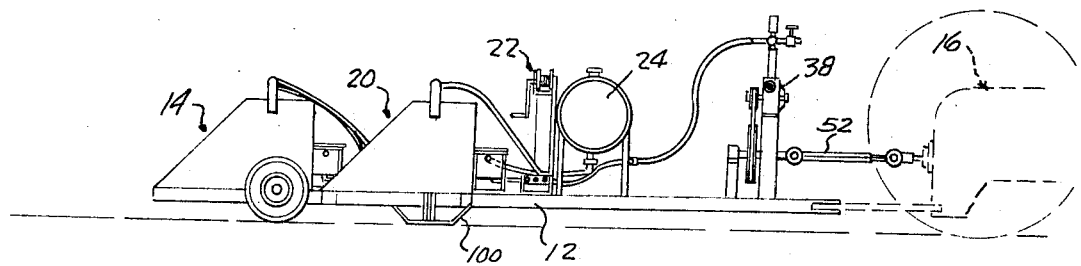
FIG. 8.
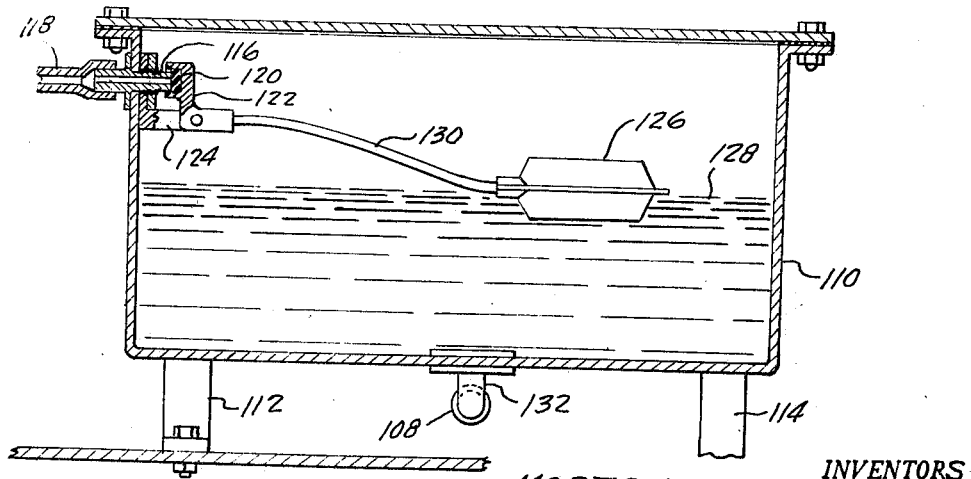

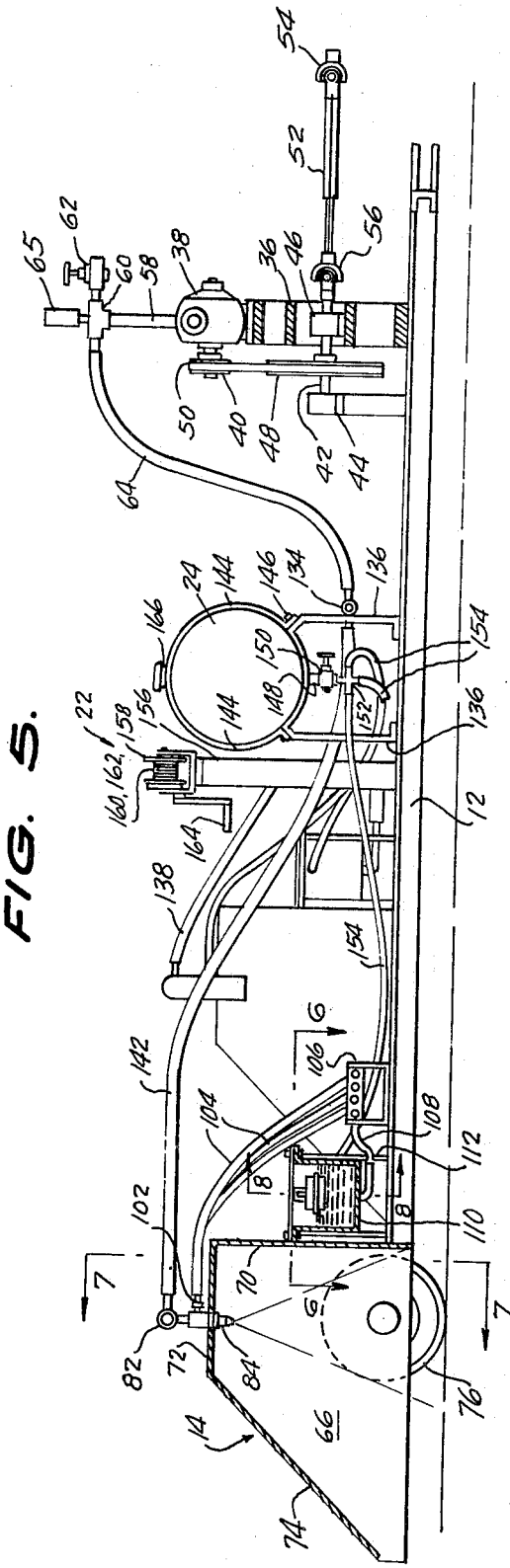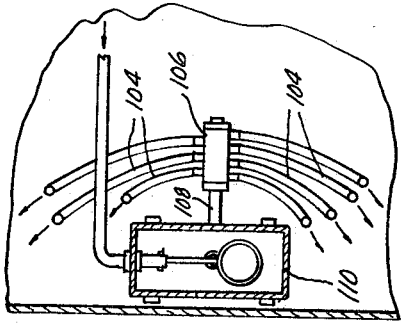

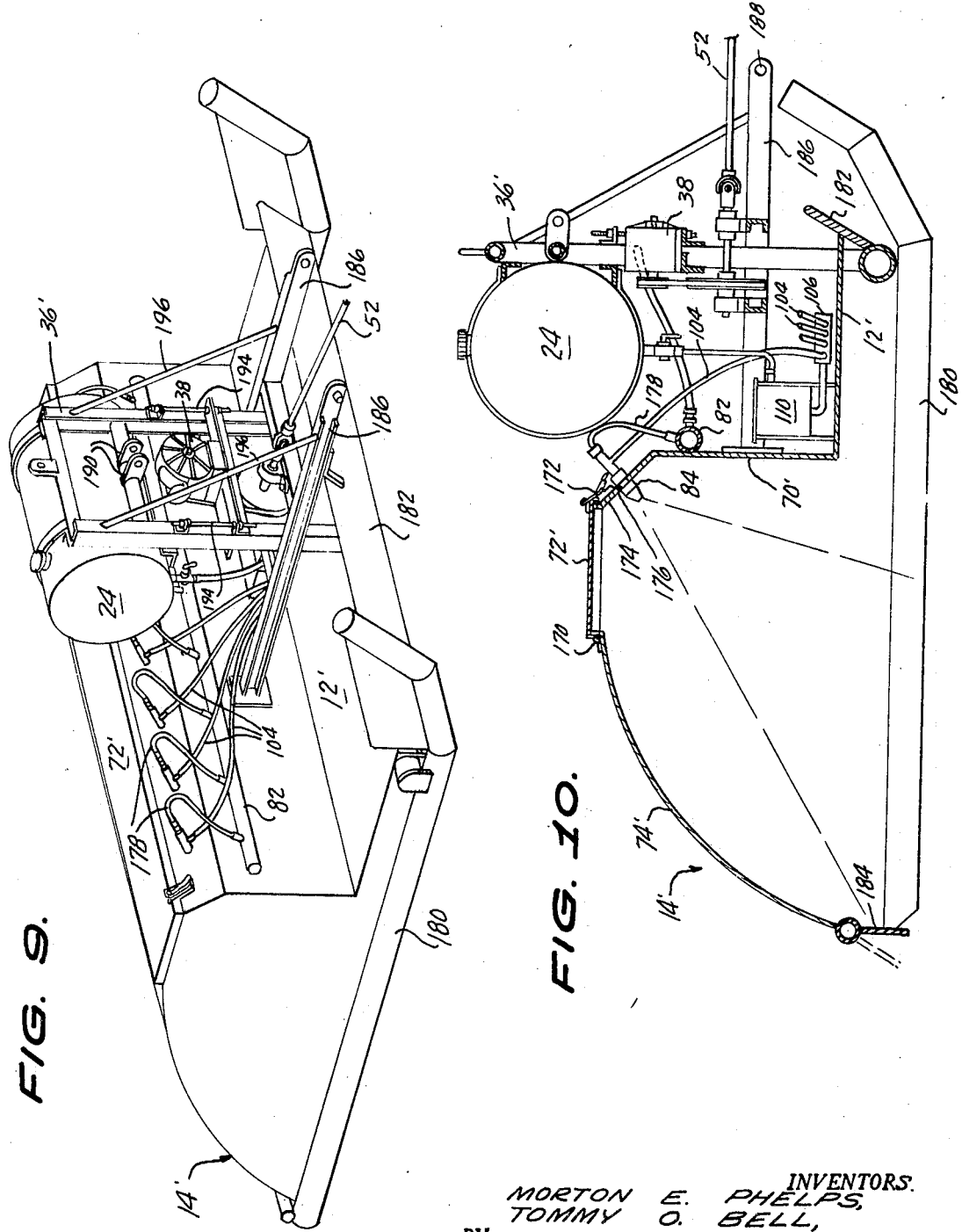

3,512,714
SPRAYER
Morton E. Phelps, 715 Thomas St., Little Rock, Ark. 72203, and Tommy O. Bell, 109 W. Main St., Hallsville, Tex. 75650
Filed Apr. 5, 1968, Ser. No. 719,149
Int. Cl. B05b 1/20
U.S. Cl. 239—168    11 Claims

ABSTRACT OF THE DISCLOSURE

A spraying device, primarily for weed and brush control and adapted to be hitched to a tractor-like vehicle, comprising a substantially horizontal platform having means on one end for connection to a towing vehicle, means for imparting mobility and for elevating the platform slightly above ground, a rigid hood secured to the platform having enclosing walls except at the bottom which is open to the ground, means for directing a spray mixture downwardly within the hood, at least a second rigid hood similar to said first hood and secured by hinge means to a side of said platform so as to extend laterally therefrom in its operative spraying position, means for directing a spray downwardly within the second hood, and means for raising the outer end of said second hood about hinge means to a substantially vertical inoperative position.

---

This invention relates, in general, to an insecticide and weed spraying equipment and pertains particularly to a tractor-mounted, rear power-take-off operated sprayer primarily for weed and brush control, but suitable also for treating field crops, grains, and the like, to eradicate insect pests.

The invention utilizes siphon-type nozzles for spraying of liquid and compressed air, the liquid being supplied at a constant pressure which is negative relative to the air pressure so that very small amounts of liquid are sucked by the air and dispersed from the nozzles as described in our co-pending application Ser. No. 598,719, filed Nov. 14, 1966, now Pat. No. 3,421,695. For a fuller understanding of the nozzles and their liquid and air supply means together with the advantages and attributes of the spraying system, reference is made to said co-pending application. In the present invention the said spraying system is incorporated in a towable trailer embodying rigid hoods for directing the sprays onto and about weeds and brush so as to completely envelop the same with droplets of insecticide, to better confine the spray mist, and to more efficiently perform a sort of mowing operation in which the spray insecticide attacks the weeds and brush for their ultimate complete removal.

Heretofore, conventional chemical mowers utilized a mixture of water and insecticide for spraying, and, accordingly, large tanks have been necessary to carry a reasonable quantity of the mixture. The time and labor involved in merely formulating the mixture are lengthy and expensive. Further, conventional sprayers of this type employ pumps and bypass systems which result in ninety percent of all maintenance problems with attendant excessive costly maintenance operations. Another disadvantage of conventional sprayers is that the nozzles are of the restrictor type to limit and control the discharge. This results in the frequent need to clean the nozzles and the occasional need to change the tips in order to alter the desired range of rate of discharge.

In the present invention the spray comprises a small amount of liquid, under constant negtive pressure, siphoned to nozzles which have relatively large orifices by the flow of compressed air thereby. The air pressure may be adjusted easily to vary the amount of liquid discharged in the spray. Consequently, the need for mixing water with the insecticide, the need for carrying the same in large tanks on the sprayer, the need for excessive maintenance time in clearing the pump ,and bypass system problems, and the need for frequent cleaning or changing of the nozzles are eliminated in the present invention.

Accordingly, a primary object of the present invention is to provide spraying apparatus, particularly for weed and brush control, in which the disadvantages and defects of conventional equipment utilizing water and insecticide mixtures are overcome by the provision of an air and liquid spray system.

Another important object of the invention is to provide an improved spraying apparatus, having the above described characteristics, in whch the spray is efficiently applied to weeds and brush within open bottom hoods carried by the sprayer.

A further important object of the invention is to provide an improved spraying apparatus, having the above described characteristics, embodying a plurality of spraying hoods, certain of which are hingedly affixed in staggered relation on a towed vehicle, together with means for raising the hoods on their hinges to enable the spray vehicle to be compacted for movements on conventional roads to and from spraying locations.

Yet a further object of the invention is to provide an improved spraying apparatus, having the above described characteristics, of relatively simple construction, easy and economical to fabricate and use, and effective to reduce spraying costs, by reduction of labor involved in the spraying, by increase of efficiency in the chemical performance of the spray to eliminate weeds and brush, and by decrease of necessary maintenance.

A still further object of the invention is to provide an improved spraying apparatus which is safer than conventional type sprayers.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a perspective view of a sprayer according to the invention attached to a tractor, shown in broken lines;

FIG. 2 is a plan view of the sprayer, alone;

FIG. 3 is a rear elevation of the sprayer;

FIG. 4 is a side elevation of the sprayer;

FIG. 5 is an enlarged sectional view taken on line 5—5 of FIG. 3, and looking in the direction of the arrows;

FIG. 6 is an enlarged, fragmentary, sectional view taken on line 6—6 of FIG. 5, and looking in the direction of the arrows;

FIG. 7 is a sectional view taken on line 7—7 of FIG. 5, and looking in the direction of the arrows;

FIG. 8 is an enlarged sectional view taken on line 8—8 of FIG. 5, and looking in the direction of the arrows;

FIG. 9 is a perspective view of a modified spraying apparatus; and

FIG. 10 is a central vertical section of the modified sprayer shown in FIG. 9.

Referring now more particularly to the drawings, FIG. 1 illustrates a preferred embodiment of the invention as comprising a mobile vehicle generally designated by the numeral 10 and including a platform 12 carrying at one end a fixed hood 14 with spraying nozzles and attached to a tractor 16, or other suitable towing vehicle, at the other end. In staggered relation to the fixed hood 14 are a pair of hingedly supported hoods 18, 20 arranged to extend laterally from the platform and having means generally indicated at 22 for lifting the hoods to vertical positions, inoperative for spraying, during such times as the sprayer is moved along conventional streets and roads to locations where the hoods may be lowered for spraying purposes. On the platform 12 is supported a compressor for supplying air at adjustable pressure to the spraying nozzles mounted on the hoods, a reservoir tank 24 for storing a supply of liquid insecticide, and the necessary conduits for providing liquid and air to the individual nozzles in the hoods. The sprayer includes, in addition, constant level tanks in fixed relation to the hoods for supplying liquid insecticides to the nozzles, as will be later described.

The platform 12, as seen in FIG. 2, is generally elongated from front to rear and has a triangular-shaped forward section 26 extended forwardly still further by a pair of angle irons 28 welded together at their fronts and welded to the sides of the platform forward section at their rears. To the angle irons 28 is connected a forwardly disposed tongue 30 with aperture 32 for pivotally receiving a hitch pin, not shown, which connects the sprayer to a tractor.

A support plate 34, secured in any suitable way to the angle irons 28 and the forward section 26 of the platform, has bolted thereto an upright frame 36, FIG. 5, on whose upper edge is secured a conventional air compressor 38 having a drive pulley 40. Rearwardly of the frame 36 on a drive axle 42 journaled in bearings 44, 46 is mounted a larger pulley 48 connected to the compressor pulley 40 by a belt, or chain 50. A standard power-take-off on the tractor may be spline coupled to the drive axle 42 by a shaft 52 having a pair of spaced universal joints 54, 56.

The output of compressor 38 is connected to an upstanding rigid duct 58 having a T-connection 60 thereon, one end of the T-connection exhausting to atmosphere and carrying a shut-off valve 62, while the other end of the T is connected by a flexible conduit 64 to inlet manifolds for the spray nozzles, as will be subsequently described. The T-connection 60 also mounts a pressure gauge 65, and these parts, together with additional controls if desired, are all carried by the upstanding frame 36 at the forward end of the platform 12 within reach of the tractor driver for observation and manual manipulation to vary the air pressure and thus, the rate of spray discharge.

At the rear end of the platform 12 is fixed, in any suitable manner, the rigid hood 14 having sidewalls 66, 68, a substantially horizontal top wall 72, and a downwardly and rearwardly sloping wall 74. The sidewalls 66, 68 each rotatably carries a small wheel 76 on a stub axle so as to elevate the platform 12 a few inches above the ground, permitting ingress of grass, weeds, brush, and the like into the open bottom of the hood. The sidewalls 66, 68 each also carries an upstanding bracket 78, 80 to which is attached a hollow manifold 82 which passes air to the nozzles 84 secured at their upper ends in openings in the manifold and which pass downwardly through centrally aligned openings in the top wall 72 so that their discharge ends direct the individual sprays downwardly in a diverging manner within the hood, as best seen in FIG. 7. Any suitable means may be used for securing and/or sealing the nozzles in the hood apertures, Referring now to FIG. 2, it will be seen that at the sides of the platform 12 there are horizontal platforms 86, 88 of smaller size, each having a forwardly and inwardly sloping edge 90 which is aligned with an edge of the forward portions 26 of the center platform. Each of these subsidiary platforms is hinged by three hinges 92, 94, 96 at their inner sides to the side edges of the center platform 12. The hinges have horizontal longitudinally disposed pivot axes which enable the platforms 86, 88 to be lifted to vertical positions, as shown in broken lines in FIG. 3, when the sprayer is being moved along roads, streets, and the like, to new locations for spraying. At the rear of each of the subsidiary platforms 86, 88 are fixed the pair of rigid hoods 18, 20 which are, in all respects, similar to the hood 14 at the rear of the center platform, and each of which is provided with similar nozzles and supply apparatus for emitting sprays within the hoods. It will be noted that the hoods 18, 20 are aligned with each other laterally of the sprayer, but are in longitudinal staggered relation with respect to the hood 14, and that the hoods 18, 20, when in their respective positions shown in FIG. 1, are supported on mobile skids 98, 100 for elevating the hoods and supporting the subsidiary platforms 86, 88 at the same level as the center platform 12.

The nozzles 84 may be any conventional ones, those preferred and illustrated each having a central bore through which compressed air passes from the hollow manifold 82 at the top of the hood to the spray discharge end, said bores each having a relatively large liquid inlet aperture in which an inlet nipple 102 is threaded and to which a flexible conduit 104 carrying the liquid to be sprayed is connected. A conduit 104 is provided for each nozzle. Desirably, these conduits extend from a distributor 106 which is connected by a conduit 108 to the outlet of the individual constant level tank 110 which supplies each hood.

The constant level tanks 110 are best illustrated in FIGS. 5, 6 and 8, and comprise sealed housings which may take any shape and may be formed of any suitable material. Plexiglass tanks have been found to be very successful and long-lived in this application. Each tank is supported on pairs of legs 112, 114 suitably secured to the platform 12, or to one of the subsidiary platforms 86, 88. The inlet for each tank is best shown on FIG 8 as being a nipple 116 connected to the supply conduit 118 and passing through an aperture in the upper portion of the tank. A closure valve 120 mounted at one end of the crank 122 pivoted to a bracket support 124 closes the inlet nipple when the float 126 is at the desired level indicated at 128. The float is connected by a rigid arm 130 to the other end of the crank 122.

An outlet nipple 132 is secured in the bottom opening of each tank 110 and connected to a distributor 106 by conduit 108, as mentioned above. It should be noted, particularly from FIG. 5, that the level 128 of the spray liquid in each tank 110 is fixed at a given distance below the liquid inlets to the nozzles 84 by the position and arrangement of the tank, its float and related parts, so that liquid for each spray must be siphoned upwardly into the nozzle by action of the flow of compressed air therethrough, the amount of liquid being sucked into a nozzle being dependent on the air pressure and the pressure of the liquid being negative with respect to the pressure of the air. Accordingly, the proportion of liquid to air being sprayed may be accurately set and maintained for discharge at whatever rate desired by merely adjusting the air pressure. The described spray system, therefore, is substantially the same as that disclosed in our co-pending application Ser. No. 598,719, mentioned above, and differs therefrom only in that no provision is made for varying the height of the constant level in the supply tank, or the height of the tank, although the height of the liquid shut-off level may be set, as desired, by bending the float rod 130.

Referring again to the air supply system, it will be noted from FIG. 5 that conduit 64 leads from the T-connection 60 above the compressor 38 to a common manifold 134 supported on upstanding legs 136 of a frame for reservoir 24 secured to the platform 12 approximately in the center thereof. The manifold 134 at its ends is coupled to conduits 138, 140, FIG. 2, leading to the manifolds 82 on the subsidiary hoods 18, 20, while a third and central conduit 142 leads to manifold 82 on hood 14. The legs 136 serve to support the liquid reservoir tank by means of a pair of semicircular bands 144 surrounding the latter and bolted to the upper ends of the four legs, as indicated at 146, FIG. 5. The reservoir outlet 148 incorporates a valve 150 and a connection 152 which permits three flexible conduits 154 to connect the reservoir to the inlets of the three constant level tanks 110.

An upstanding, braced A-frame 156 is secured in any suitable manner to the center platform and supports at its top the winch 22 which includes a drum 158 over which is wound a pair of cables 160, 162 connected at their other ends to the outer ends of the hinged hoods 18, 20. A crank 164 and gear connnection to the drum enables turning of the drum to wind up the cables and lift the hoods and their connected subsidiary platforms to their inoperative positions shown in broken lines in FIG. 3. The winch may be of conventional form and preferably includes a locking dog for holding the drum in any desired position.

The reservoir 24 is filled through its inlet tube 166 at the top thereof and stores a suitable quantity of a very concentrated, liquid insecticide, or weed killer, or the like. To control the rate of spray of the liquid weed killer, or insecticide, air under pressure is led from the compressor 38 through the conduits 64 and 138, 140 or 142 to the hollow booms 82 and into the spray nozzles 84 connected thereto. Air pressure may be read in the pressure gauge 65 and the valve 62 leading to atmosphere may be manipulated to partially relieve the pressure and adjust the same. When the valve is completely open, all of the air exhausts to the atmosphere, reducing the pressure in the booms and at the nozzles to zero. At such time the spray is immediately cut off, and all liquid in the nozzle inlet nipples 102 drains by gravity back toward the undersides of the constant pressure tanks 110 and away from the nozzles.

The operation of the spray apparatus, having been partially described in the preceding paragraphs, will now be obvious. With the winch 22 operated to elevate the side hoods 18, 20, the tractor and coupled sprayer may be driven over streets and roads to the field locations where the sprayer is desired to be utilized. Once at location, the winch is operated to lower the side hoods 18, 20. The tractor power-take-off is connected to the compressor 38 ad the air pressure valve 62 adjusted to yield a desired pressure of air to the nozzles, and a comparable proportion of liquid to be sprayed. The tractor may then be driven over the field to be sprayed first along one edge in one direction and then turned to move in the opposite direction, guided by the skid marks of the previous maneuver so as not to overlap, or to only slightly overlap, with the area previously sprayed. This is continued until the entire field, lawn, farm, etc., has been covered with the spray. During the movement of the sprayer, the three platforms 12, 86, 88, at their forward edges bend the high weeds and brush downwardly for passage under each of the platforms. As the machine moves over the vegetation, the weeds, grasses, and small brush, up to three feet in height, rise into the three hoods 14, 18 and 20 and then exit at the backs of the hoods. As this is taking place, the chemical is being dispersed within the hoods downwardly through the weeds, grass and brush to the ground level where it remains after the machine moves on. Visual observation immediateely following the application is that of a mist slowly rising from the earth, itself. Thus, every leaf and insect receives an application of hundreds of particles in the 100 micron class, and the application is applied to the undersides as well as to the tops of the leaves and other matter.

It has been found, in the spraying of thousands of acres of exhaustive field tests, that superior weed, grass and brush control was obtained. The sprayer has been successful in controlling many heretofore hard to kill perennials and exercises some control over even young grass, persimmon, sand bur and crabgrass.

It should be noted that the center and side platforms 12, 86 and 88 perform the triple functions of supporting the spray apparatus, bending down the high weeds and brush as the sprayer moves forwardly, and enabling a worker to ride on the mower-sprayer, if necessary to control the spraying rate, and perform maintenace to ensure proper operation of the equipment, as for example to re-connect a conduit disconnected by high pressure, or otherwise.

In FIGS. 9 and 10 is shown annother preferred embodiment of the invention consisting of but a single section and one hood, rather than three sections with supplementary hinged hoods. This embodiment is smaller and less complex and is more suitable for spraying small areas, sharp corners, and the like, less accessible to the larger apparatus. However, except for size and except for the differences noted hereinafter, the embodiment to be described is the same in all respects as the embodiment shown in FIGS. 1–8. The platform 12' is shorter than the center platform of the previous embodiment, but carries the same reservoir tank 24, air compressor 38, and constant level tank 110. The supports for the air compressor and the reservoir are replaced by a single, compact frame 36'. The rear wall 74' of hood 14' is curved rather than straight and inclined, and the top wall 72' is hinged at 170 to provide access to the nozzles 84 for cleaning and maintenance at intervals, when required. Otherwise, the top wall, or door 72' is held shut by latches 172. The forward wall 70' of the hood is provided with an upwardly and rearwardly inclined section 174 in which the apertures 176 are provided to receive the nozzles 84 to direct sprays at right angle to section 174 and in a rearwardly and downwardly inclined direction. Because of the change in position of the nozzles, the air manifold 82 is welded, or otherwise secured, to the forward wall of the hood and separate flexible conduits 178 connect this manifold to each of the spray nozzles. Instead of wheels, the sprayer carries, at its bottom, tubular skids 180 having upturned portions at the forward ends. A front plate 182 upwardly and forwardly inclined, at substantially the same angle as the front of the skids, serves to press the weeds and brush downwardly as the sprayer moved forwardly. The bottom edge of the rear wall of hood 14' is provided with a hinged flexible door 184 which may be weighted, if desired, to fall vertically and normally close the rear opening of the hood until such time as forced by movement of the weeds egressing from under the hood to an outwardly projecting angle as shown in broken lines in FIG. 10, for better egress of the weeds from under the hood. A pair of horizontal channel bars 186 are welded at their rear ends to supporting plates secured to the front wall of the hood, and the forward ends of these bars provide pins 188 for attachment at two points of a three-point hitch to a towing tractor. The third point of the hitch may be located at the pair of lugs 190 provided with apertures for a pin to complete the hitch therethrough, the lugs being firmly secured to a bracing rod connecting the side members of the frame 36'. The compressor is mounted on a shelf 192 supported from the same frame by adjustable threaded rods 194 and nuts serving to secure the rods in various positions in supporting brackets. Bracing rods 196 tie frame 36' and bars 186 together. In substantially all other respects the FIG. 9 embodiment is identical with the central hood section of the FIG. 1–8 embodiment.

It will be apparent that the hood structure employed in FIG. 9 together with the nozzle placement and air and liquid supply structure may be substituted in the FIG. 1 embodiment, or vice versa. Similarly, the skids 180 of FIG. 9 may be utilized under the center platform of the FIGS. 1–8 embodiment, if so desired. However, for movement between spraying locations the wheel structure for the center section of the FIG. 1 embodiment, with skids on the outer sections which may be raised off the ground during transport, is preferred.

Although certain specific embodiments of the invention have been shown and described, it is obvious that many modifications thereof are possible. The invention, therefore, is not to be restricted to the exact showing of the drawings and description thereof, but is considered to include reasonable and obvious equivalents.

What is claimed is:

1. A sprayer primarily for weed and brush control and adapted to be hitched to a tractor-like vehicle, comprising a substantially horizontal platform having means on the forward end for connection to a towing vehicle, means for imparting mobility and for elevating the platform slightly above ground, a rigid hood secured to and extending rearwardly of the platform, said hood having a top wall, sidewalls and forward and rear walls but being open at the bottom, a plurality of siphon nozzles mounted in openings in the upper portion of said hood to direct a spray mixture of liquid and air downwardly within the hood, a liquid tank supported from said platform a fixed distance below said nozzles, means in said tank for maintaining a constant level of liquid, conduit means connecting an outlet of said tank to said nozzles, a liquid reservoir mounted on said platform and having an outlet connected for gravity feed to said tank, an air manifold affixed to said hood and having outlets connected to said nozzles, and a compressor on said platform connected to feed air under adjustable pressure to said manifold.

2. A sprayer according to claim 1, wherein said nozzles are mounted in the forward wall of said hood and inclined downwardly and rearwardly, said hood having a hinged door in its top wall permitting access to the nozzles for cleaning and maintenance.

3. A sprayer according to claim 2, wherein said rear wall of said hood is provided with a flexible dependent door hinged at its top and liftable by relative motion of weeds to the moving hood to permit egress of the weeds from under the hood.

4. A sprayer primarily for weed and brush control and adapted to be hitched to a tractor-like vehicle, comprising a substantially horizontal platform having means on the forward end for connection to a towing vehicle, means for imparting mobility and for elevating the platform slightly above ground, a first rigid hood secured to and extending rearwardly of the platform, said hood having a top wall, sidewalls and forward and rear walls but being open at the bottom, a plurality of siphon nozzles mounted in openings in the upper portion of said hood to direct a spray mixture of liquid and air downwardly within the hood, a liquid tank supported from said platform a fixed distance below said nozzles, means in said tank for maintaining a constant level of liquid, conduit means connecting an outlet of said tank to said nozzles, a liquid reservoir mounted on said platform and having an outlet connected for gravity feed to said tank, an air manifold affixed to said hood and having outlets connected to said nozzles, a compressor on said platform connected to feed air under adjustable pressure to said manifold, at least a second and third rigid hood similar to said first hood and secure by longitudinal, horizontal pivots to the sides of said platform so as to extend laterally therefrom in their operative positions, and means for raising the outer ends of said second and third hoods about said pivots to substantially vertical inoperative positions, said second and third hoods being each equipped with nozzles, a liquid tank and an air manifold similar to those of the first hood and being similarly supplied with liquid and air by conduits leading from said reservoir and compressor.

5. A sprayer according to claim 4, wherein said means for raising the second and third hoods comprises a crank operated winch having a drum, and cables wound about said drum and connected at their ends to the outer ends of said second and third hoods.

6. A sprayer according to claim 4, wherein said means for imparting mobility comprises a pair of small wheels mounted on a rear portion of said platform.

7. A sprayer according to claim 4, wherein said means for imparting mobility comprises a skid mounted on the bottom of said platform.

8. A sprayer according to claim 4, wherein the bottoms of said second and third hoods at their outer ends are provided with skids.

9. A sprayer according to claim 4, wherein said nozzles are mounted in the top walls of said hoods so as to direct the sprays downwardly.

10. A sprayer according to claim 4, wherein said hoods are arranged in staggered relation along said platform.

11. A sprayer primarily for weed and brush control and adapted to be hitched to a tractor-like vehicle; comprising a substantially horizontal platform having means on the forward end for connection to a towing vehicle, means for imparting mobility and for elevating the platform slightly above ground, a first rigid hood secured to and extending rearwardly of the platform, said hood having a top wall, sidewalls and forward and rear walls but being open at the bottom, a plurality of siphon nozzles mounted in openings in the upper portion of said hood to direct a spray mixture of liquid and air downwardly within the hood, a liquid tank supported from said platform a fixed distance below said nozzles, means in said tank for maintaining a constant level of liquid, conduit means connecting an outlet of said tank to said nozzles, a liquid reservoir mounted on said platform and having an outlet connected for gravity feed to said tank, an air manifold affixed to said hood and having outlets connected to said nozzles, a compressor on said platform connected to feed air under adjustable pressure to said manifold, at least a second rigid hood similar to said first hood and secured by a longitudinal, horizontal pivot to one side of said platform so as to extend laterally therefrom in its operative position, and means for raising the outer end of said second hood about said pivot to a substantially vertical inoperative position, said second hood being equipped with nozzles, a liquid tank and an air manifold similar to those of the first hood and being similarly supplied with liquid and air by conduits leading from said reservoir and compressor.

References Cited

UNITED STATES PATENTS

| 1,500,857 | 7/1924 | Woodruff | 239—168 X |
| 2,740,664 | 4/1956 | Yates | 239—172 X |
| 2,976,647 | 3/1961 | Pickrell | 239—159 X |

FOREIGN PATENTS

| 685,211 | 12/1952 | Great Britain. |

M. HENSON WOOD, JR., Primary Examiner

J. J. LOVE, Assistant Examiner

U.S. Cl. X.R.

239—159, 172